United States Patent [19]

Bellows

[11] Patent Number: 5,582,135
[45] Date of Patent: Dec. 10, 1996

[54] COLLAPSIBLE AND DISPOSABLE PET LITTER CONTAINER

[76] Inventor: Wallace L. Bellows, 3761 N. Lincoln Rd., Las Vegas, Nev. 89115

[21] Appl. No.: 463,923

[22] Filed: Jun. 5, 1995

[51] Int. Cl.[6] .................................................. A01K 67/00
[52] U.S. Cl. .......................................... 119/168; 119/498
[58] Field of Search ................................... 119/165, 168, 119/170, 498, 499; 229/101, 117.02

[56] References Cited

U.S. PATENT DOCUMENTS

| | | | |
|---|---|---|---|
| 577,416 | 2/1897 | Brown | 229/117.02 |
| 4,014,292 | 3/1977 | Coughlin et al. | |
| 4,181,095 | 1/1980 | Sylogye | 119/168 |
| 4,711,198 | 12/1987 | Mossbarger | |
| 4,736,707 | 4/1988 | Christie | 119/168 |
| 4,776,300 | 10/1988 | Braddock | |
| 4,801,006 | 1/1989 | Martin et al. | 119/168 |
| 4,807,564 | 2/1989 | Soberg et al. | 119/165 |
| 4,807,808 | 2/1989 | Reed | 119/168 |
| 4,846,103 | 7/1989 | Brown | |
| 4,858,561 | 8/1989 | Springer | 119/165 |
| 4,940,016 | 7/1990 | Heath | |
| 4,986,217 | 1/1991 | Robinson et al. | 119/168 |
| 4,998,504 | 3/1991 | Ball | 119/168 |
| 5,007,530 | 4/1991 | Weismantel | 206/45.21 |
| 5,065,702 | 11/1991 | Hasiuk | 119/168 |
| 5,134,973 | 8/1992 | Sarullo | 119/165 |
| 5,178,100 | 1/1993 | Monk | 119/168 |
| 5,211,134 | 5/1993 | Bolo, III | 119/168 |
| 5,377,700 | 8/1994 | Toft | 119/168 |

*Primary Examiner*—Todd E. Manahan
*Attorney, Agent, or Firm*—H. Dennis Kelly; Timmons & Kelly

[57] ABSTRACT

Three pieces are stamped out of a rigid flat material. A bottom piece having a bottom, a pair of side walls, a pair of end walls, and panel flaps is folded to form a tray for holding a plastic bag containing a quantity of pet litter. A middle piece forming a pair of side walls, a front wall and a rear wall is assembled into a single continuous loop, and fits snugly around the tray formed from the bottom piece. A top piece having a center panel, two end panels and a lip running around the perimeter of each end panel fits onto the middle piece to form a lid. The middle piece has an intermediate fold in each side wall, allowing the middle piece to collapse along the intermediate folds and the foldable adjoining edges of the side walls. The top piece collapses into a box in which the collapsed middle piece, the plastic bag and the tray formed from the middle piece are stored. A handle integral with and formed out of part of the top piece allows the container to be carried like a suitcase in the collapsed state. An opening in one side wall allows entry and exit into the litter container by a pet.

10 Claims, 4 Drawing Sheets

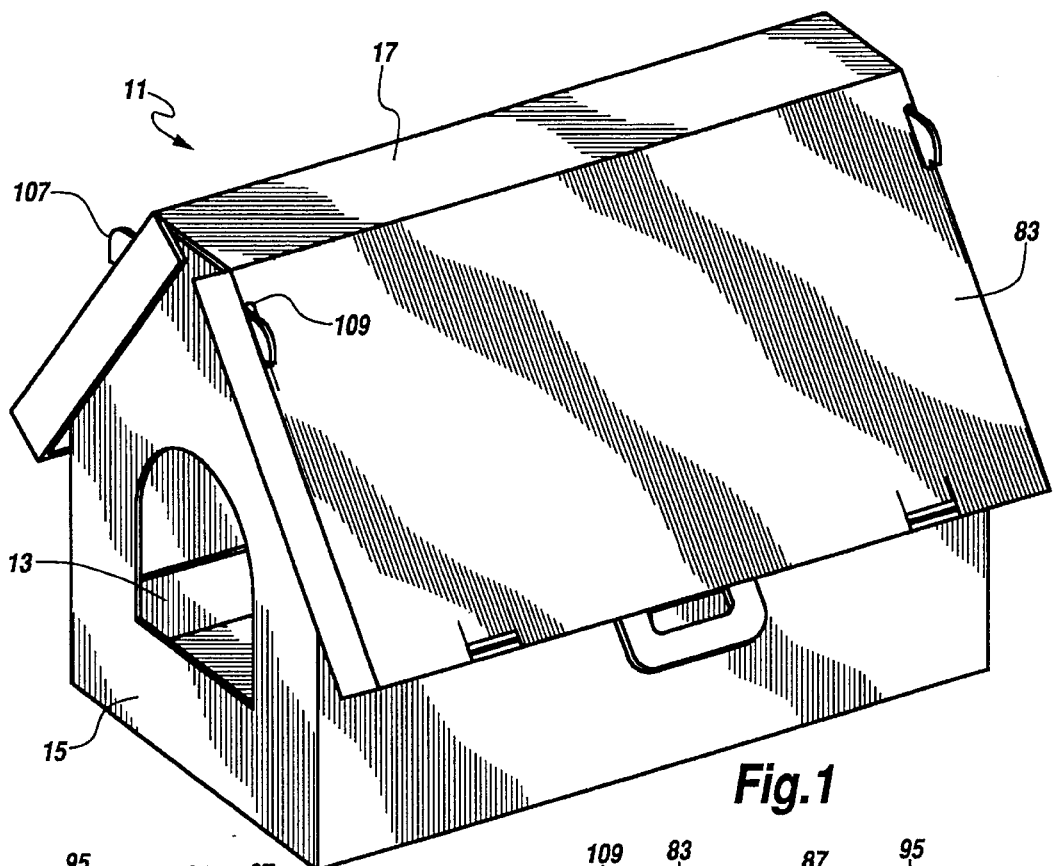
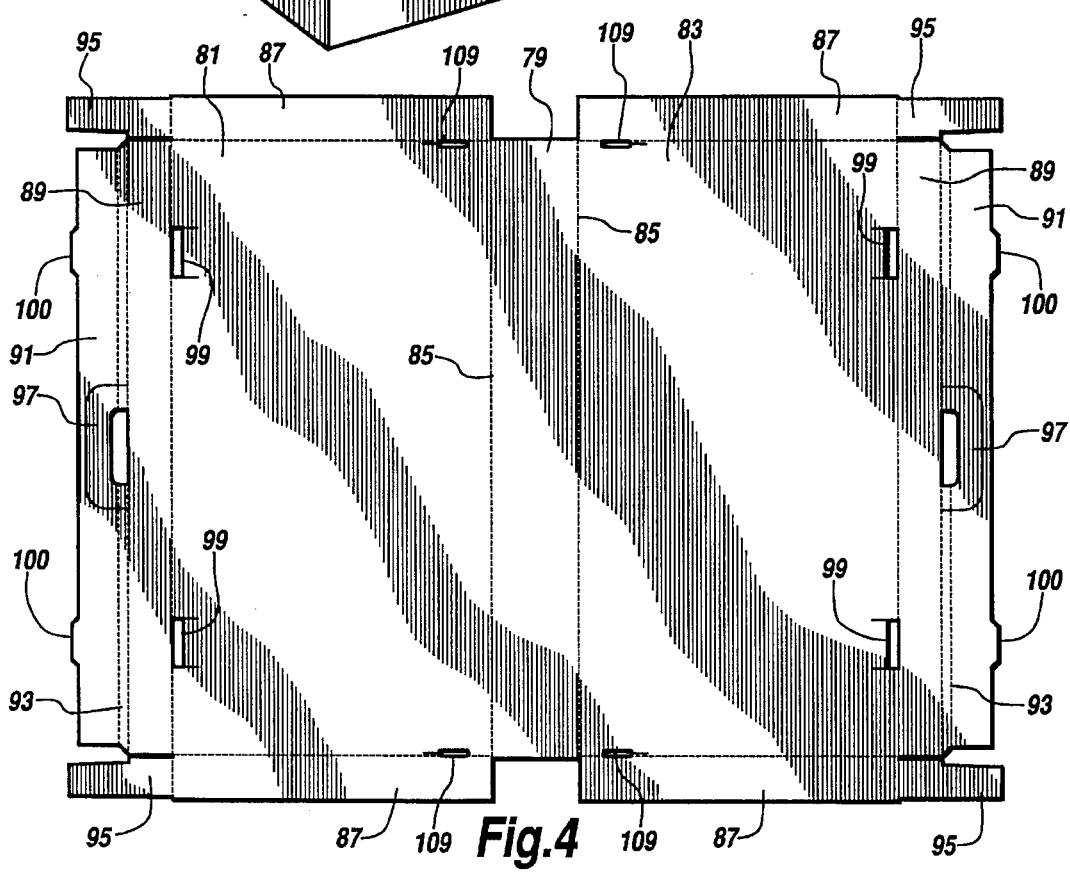

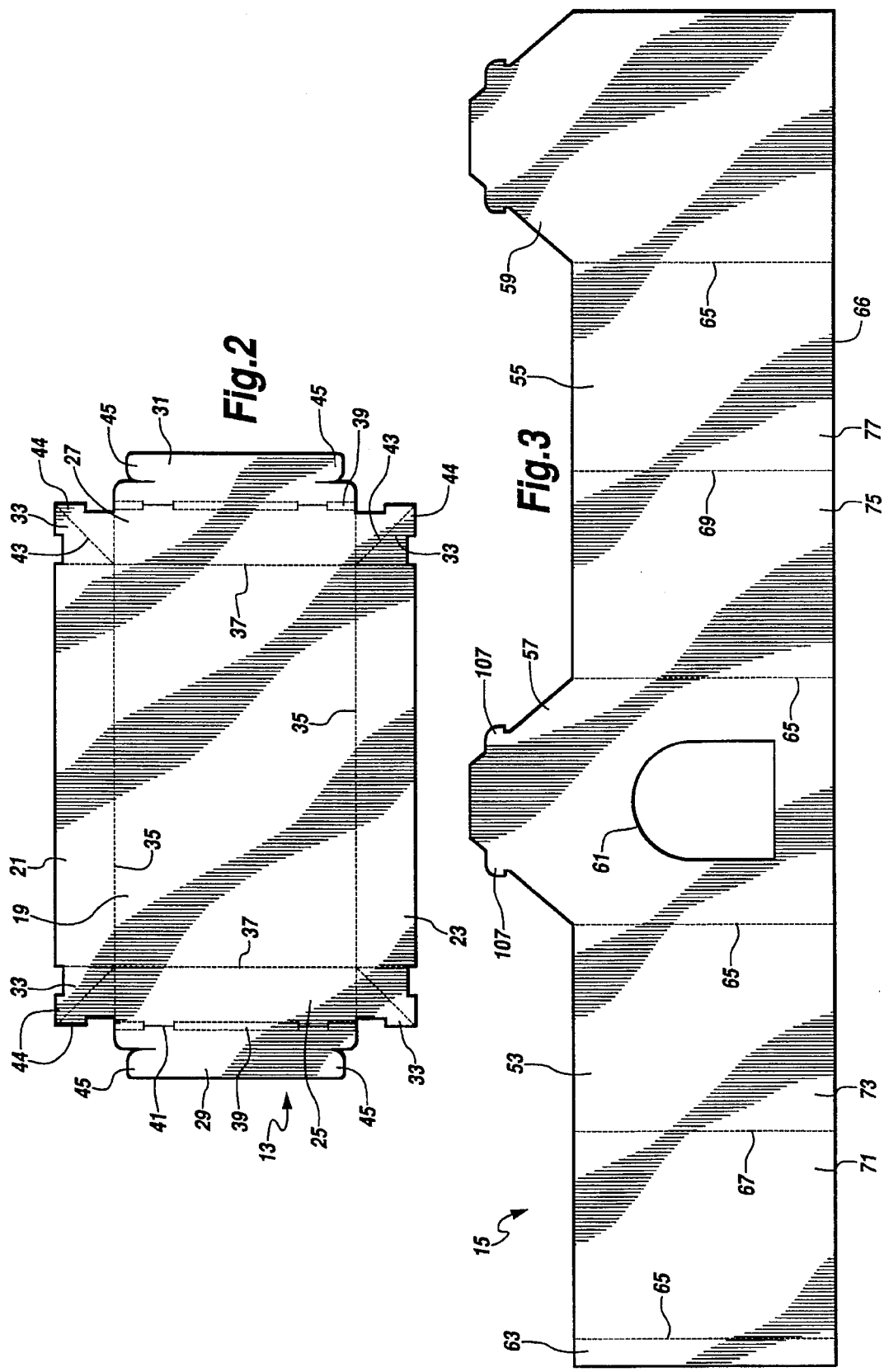

1

COLLAPSIBLE AND DISPOSABLE PET LITTER CONTAINER

BACKGROUND OF THE INVENTION

1. Field of the Invention This invention relates in general to pet litter containers, and in particular to a pet litter container that can be transformed from a collapsed, transportable state into an erect state forming an enclosure with a separate tray holding the pet litter.

2. Description of the Related Art

Conventional cat litter boxes are generally perceived as necessary but undesirable, in that they inevitably develop unpleasant odors and allow litter to be scattered outside the box on the floor. Disposable cat litter boxes are known in the prior art.

U.S. Pat. No. 4,940,016, issued to Heath, discloses a litter box constructed from a single piece of reinforced cardboard. When assembled, the device forms an enclosure with upright front and rear walls and short side walls integral with a roof having steeply sloping side faces and a narrow center spine that has an integral inset handle. Assembly requires numerous folding and manipulating steps. The handle is not accessible when the box is collapsed.

A need remained for a collapsible and disposable pet litter container that is simple to assemble. A litter container that can be carried around like a suitcase when collapsed was also desired. As always, a litter container that is less expensive to construct was also desired.

SUMMARY OF THE INVENTION

The general object of the invention is to hold pet litter for use by a pet. In concert with this object, another object of the invention is to prevent spillage of the pet litter outside the device.

Other objects are that the container be made from disposable material, and be capable of collapsing into a small, transportable package and expanding back into an erect enclosure. At the same time, an object is that assembly of the container be intuitive and require a minimum number of steps. Yet another object is that the invention contain its own litter and be disposable without requiring removal of the litter.

To achieve these objects, the container is constructed with a bottom piece defining a tray for holding the litter, a middle piece that forms walls around the tray, and a top piece that forms a lid for the container. The top piece and the middle piece are designed to give the appearance of a house with a sloped roof when assembled together.

The middle piece is made from a single piece of material with folds that form the wall edges. One pair of opposed walls in the middle piece has additional folds to enable these walls to collapse, so that the middle piece will collapse into a small volume with roughly the same cross sectional area as that of the tray.

The top piece has a lip running along most of the outer edges. When the top piece collapsed, it forms the shape of a narrow box or carrying case, in which the bottom piece and the collapsed middle piece can be stored.

In addition, a bag containing pet litter rests in the tray. The bag is designed to be easily opened to expose the litter for use.

The above, as well as additional objects, features, and advantages of the invention will become apparent in the following detailed description.

BRIEF DESCRIPTION OF THE DRAWINGS

FIG. 1 is a perspective view of a collapsible and disposable pet litter container according to the invention, as it appears in the assembled and erect state.

FIG. 2 is a top plan view of the bottom piece of the container when unfolded.

FIG. 3 is a top plan view of the middle piece of the container when unfolded.

FIG. 4 is a top plan view of the top piece of the container when unfolded.

DESCRIPTION OF THE PREFERRED EMBODIMENT

Figure 5:
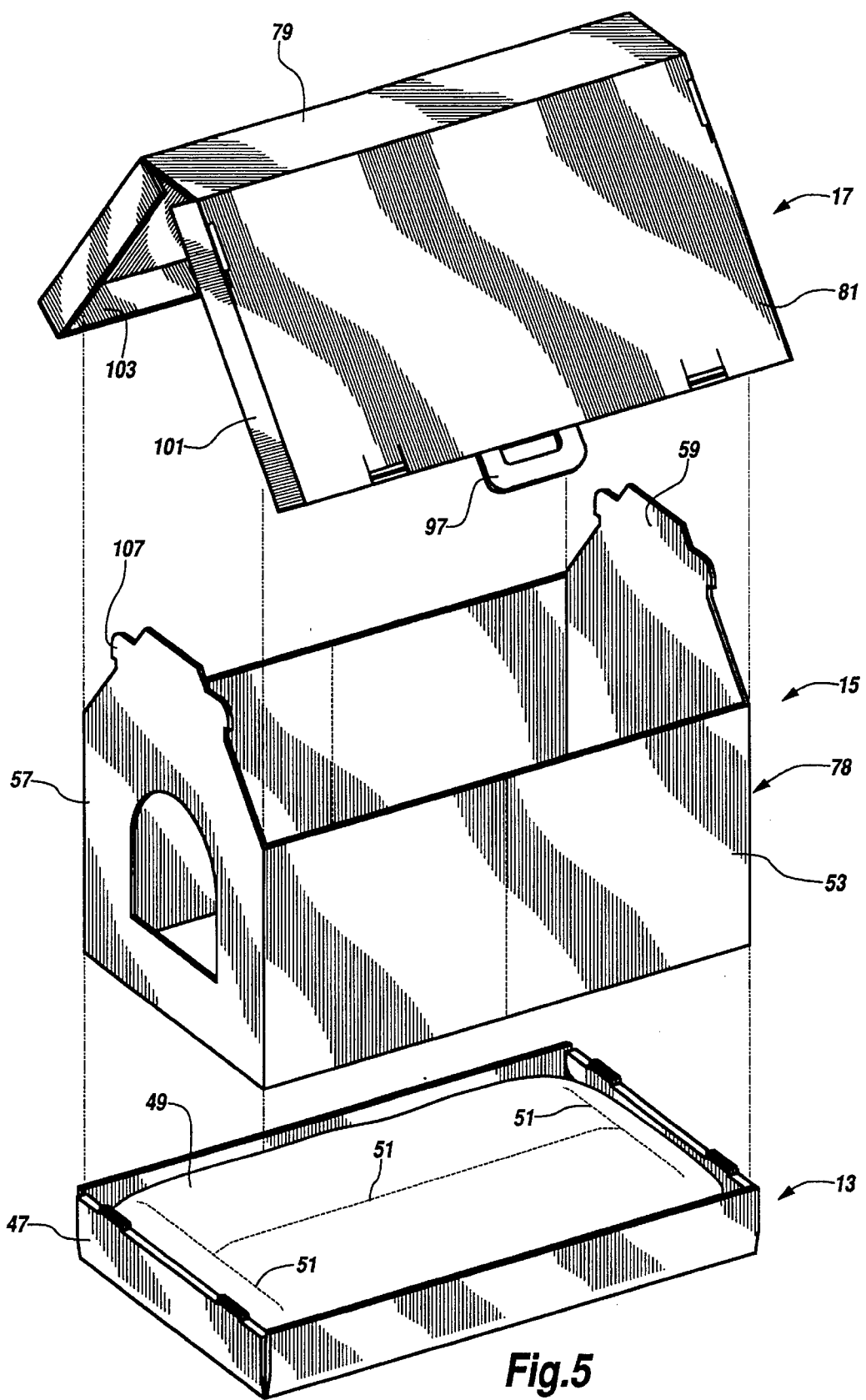
FIG. 5 is a exploded perspective view of a collapsible and disposable pet litter container according to the invention, including a bag containing litter for use in the assembled container.

The collapsible and disposable pet litter container 11 of the invention has a bottom piece 13, a middle piece 15, and a top piece 17 that, in an assembled and erect state as shown in FIG. 1, form a house-like structure. The middle piece 15 is designed to fit snugly over and around the assembled bottom piece 13. The pieces 13, 15, and 17 are constructed from an inexpensive, fairly rigid material, such as reinforced cardboard.

As shown in FIGS. 2–4, the bottom piece 13, middle piece 15, and top piece 17 are each constructed from a single flat stamped piece of material. The bottom piece 13, shown in FIG. 2, includes a rectangular bottom 19, a pair of side walls 21 and 23, and a pair of end walls 25 and 27. End wall flaps 29 and 31 extend from the outer edges of the end walls 25 and 27. There are four identical corner flaps 33, one located at each corner formed by junction of the bottom 19, a side wall 21–23, and an end wall 25–27. Foldable creases 35 and 37 are formed along the adjoining edges of the bottom 19, the side walls 21–23, and the end walls 25–27. The folds 39 between the end wall flaps 29 and 31 and the side walls 25 and 27 are made of two parallel fold lines, separated by a distance roughly equal to the thickness of two layers of the container material. Two slits 41, adapted to receive the corner flaps 33 as described below, are cut along each fold 39.

To assemble the bottom piece 13, the bottom piece 13 is laid flat on a horizontal surface, so that it looks like FIG. 2 when viewed from overhead. The side walls 21 and 23 and the end walls 25 and 27 are folded upward from the bottom 19 along the creases 35 and 37. During this step, the corner flaps 33 fold together along a centerline fold 43 to form four double-thickness flaps (not shown), that are then pressed flat against the adjoining end walls 25 and 27. The end wall flaps 29 and 31 are then folded downward toward the bottom wall 19 along the folds 39, partially covering the folded corner flaps 33. The slits 41 receive extensions 44 on the top edges of the folded corner flaps 33. Tabs 45 on the end wall flaps 29 and 31 are then tucked between the corner flaps 33 and the end walls 25 and 27 to lock the assembly in position.

The assembled bottom piece 13 forms a tray 47, as shown in FIG. 5, for holding the litter. A plastic bag 49 contains the litter (not shown) when purchased. Perforated seams 51 allow the bag to be opened easily. The bag 49 acts as a waterproof liner for the litter during use.

As shown in FIG. 3, the middle piece 15 includes a pair of rectangular side walls 53 and 55, a front wall 57, and a rear wall 59. The two side walls 53 and 55 are substantially identical to each other, and the front wall 57 is substantially identical to the rear wall 59, except that the front wall 57 has a doorway 61, sized to allow a pet to pass through. In addition, a narrow tab extends from one side wall Identical foldable creases 65, all perpendicular to the bottom edge 66, define the adjoining edges of the four walls 53, 55, 57, and 59. Intermediate folds 67 and 69 are formed in the side walls 53 and 55 parallel to and midway between the other creases 65. The intermediate folds 67 and 69 need not be midway between adjacent creases 65, as long as the width of the side wall halves 71, 73, 75, and 77 created are all less than the width of the other side walls 57 and 59 by at least one thickness of container material.

The middle piece is permanently assembled by folding the side walls 53 and 55, the front wall 57, the rear wall 59, and the narrow tab 63 along the creases 65 into a rectangular loop, with the rear wall 59 overlapping the narrow tab 63. The tab 63 is glued in place behind the rear wall 59, resulting in a single unit 78, as shown in FIG. 5. The single unit 78 is designed to fit snugly around the tray 47 formed by the assembled bottom piece 13.

The top piece 17, shown in FIG. 4, includes a rectangular center panel 79, connected to two identical rectangular end panels 81 and 83 along two identical parallel creases 85 that define adjoining edges of the center panel 79 and the end panels 81 and 83. Identical side flaps 87 extend from the side edges of the end panels 81 and 83. A top flap 89 extends from the remaining edge of each end panel 81 and 83. A locking flap 91 in turn extends from each top flap 89. The folds 93 between the top flaps 89 and the locking flaps 91 are made of two parallel fold lines, separated by a distance roughly equal to the thickness of the container material.

A tab 95 extends from each side flap 87 parallel to and in the same direction as the nearby top flap 89, so that the tabs 95 adjacent to one top flap 89 are mirror images of the tabs 95 adjacent to the other top flap 89. A handle hair 97 is stamped out of each of the locking flaps 91. The handle halves 97 are assembled as discussed below to form a handle to carry the container when in the collapsed state.

Figure 6:
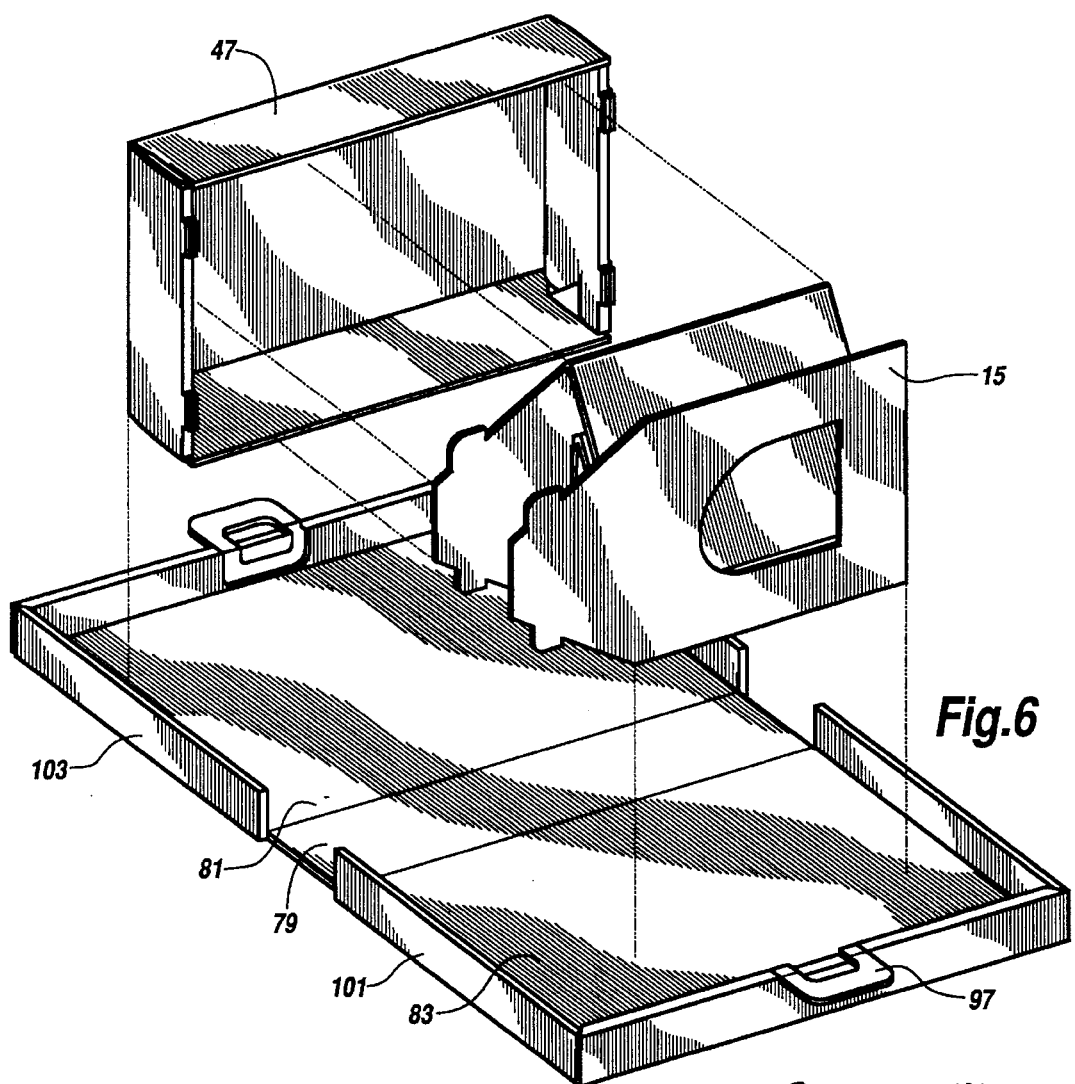
FIG. 6 is an exploded perspective view of the top piece, the middle piece, and the bottom piece as they are oriented with respect to each other when being assembled onto a transportable unit.

To assemble the top piece 17, the top piece 17 is laid flat on a horizontal surface so that it looks like FIG. 4 when viewed from overhead. The tabs 95 are folded upward from the side flaps 87. The side flaps 87 in turn are folded upward from the end panels 81 and 83, so that the tabs 95 run parallel to the edge between the end panel 81 and the top flap 89. The top flaps 89 are folded upward to meet the tabs 95. The locking flaps 91 are then folded down over the tabs 95, extensions 100 on the locking flaps 91 being received by slots 99 in the end panel 89 to lock the pieces together. When so assembled, the top flaps 87 and main top flaps 89 form two symmetrical lips 101 and 103 running along the edges of the end panels 81 and 83, as shown in FIG. 6.

Figure 7:
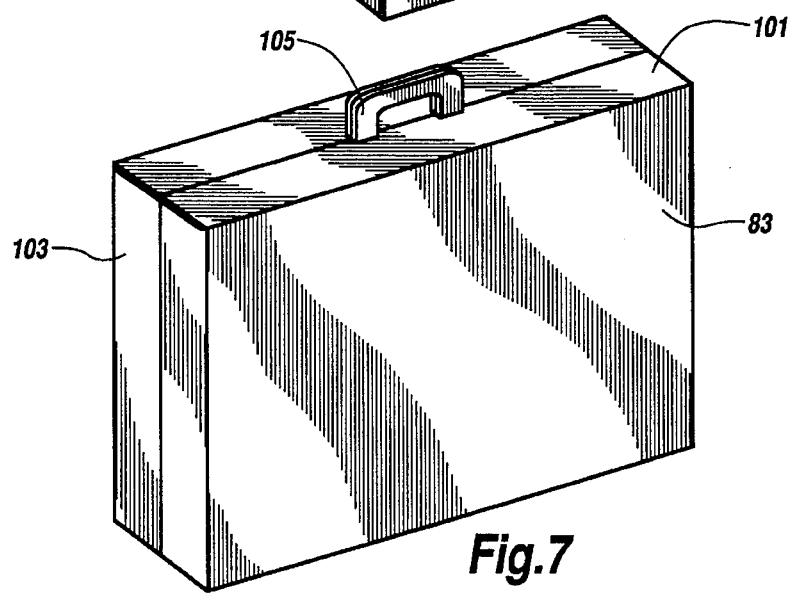
FIG. 7 is a perspective view of the container in the collapsed state.

The main parts of the container 11 are designed to fit together in a collapsed state for easy transport. FIGS. 6 and 7 illustrate the way in which the pieces fit together. Although not shown in FIGS. 6 and 7, the plastic bag 49 would fit within the tray 47 as in FIG. 5. Before assembling the container 11 into the collapsed state, the handle half 97 extending from each main top flap 89 should be folded out until it is perpendicular to the main top flap 89, pointing away from the nearby end panel 81 or 83. With the assembled top piece 17 lying on a flat surface, as depicted in FIG. 6, the tray 47 would be placed on one of the end panels 81, with the side walls 23, 25, and 27 aligned with the inside of the lip 103.

The middle piece 15 is collapsed by directing the intermediate folds 67 and 69 toward each other, while simultaneously directing the front wall 57 and the rear wall 59 toward each other. This action will cause the side walls 53 and 55 to fold into interleaving pleats, allowing the single unit 78 to collapse down to roughly the height of six thicknesses of the container material. The collapsed middle piece 15 is then placed on top of the tray 47 and plastic bag 49. The other end panel 83 and center panel 79 are then folded around the tray 47 and middle piece 15 until both of the lips 101 and 103 touch each other. The two handle halves 97 form a handle 105 that may be used to carry the container 11 like a suitcase.

Assembly from the collapsed state to the assembled and erect state is equally straightforward. The container 11 is placed with the end panel 81 on a flat surface, and the top piece 17 is opened up and laid flat, as in FIG. 6. The middle piece 15 is removed and the front wall 57 and the rear wall 59 are pulled apart until the side walls 53 and 55 are straight. Putting aside the middle piece 15, the tray 47 with the plastic bag 49 is removed from the top piece 17 and placed in the desired final location. The plastic bag 49 is opened along the seams 51 to expose the pet litter. The middle piece 13 is then lowered over and around the tray 47. Finally, the top piece 17 is turned over and placed atop the assembled middle piece 15, so that the four identical side wall tabs 107 mate with the corresponding end panel slots 109.

The collapsible and disposable pet litter container 11 of the invention has several advantages over the prior art. The container can be transported like a suitcase. It can be assembled in a minimum of steps, and the assembly process is intuitive and obvious. The walls of the container help to prevent spillage of the litter. The container is disposable without the need to remove the litter from the container.

The invention has been shown in only one embodiment. It should be apparent to those skilled in the art that the invention is not so limited, but is susceptible to various changes and modifications without departing from the spirit of the invention.

What is claimed is:

1. A pet litter container transformable between a collapsed state and an assembled state, wherein the litter container comprises:

a bottom piece having a bottom, a pair of side walls, and a pair of end walls, wherein the side walls and the end walls extend upward from the bottom to form a tray for holding pet letter;

a middle piece having a pair of side walls, a front wall, and a rear wall, the middle piece being foldable between a collapsed state, and an assembled state, in which the middle piece fits over and around the tray; and a top piece, foldable between a collapsed state, in which the top piece forms a case that completely encloses the bottom piece and the middle piece, and an assembled state, in which the top piece is attached to the walls of the middle piece.

2. A litter container as in claim 1, wherein the bottom piece further comprises foldable end flaps extending from the end walls, the side walls, end walls and end flaps interlocking to form the tray.

3. A litter container as in claim 1, wherein the side walls, front wall and rear wall of the middle piece are foldably connected in a loop to form a single unit with four adjoining edges.

4. A litter container as in claim 3, wherein each side wall of the middle piece has an intermediate fold located between and parallel to the adjoining edges.

5. A litter container as in claim 1, futher comprising a plastic liner adapted to rest in the tray formed by the bottom piece and containing a quantity of pet litter.

6. A litter container as in claim 5, wherein the liner is a bag having seams for opening the bag to expose the litter for use.

7. A litter container as in claim 1, further comprising a handle made of a pair of handle halves, each handle half extending from an end panel in the top piece.

8. A litter container as in claim 1, wherein the litter container is constructed from a reinforced cardboard material.

9. A litter container as in claim 1, wherein the front wall in the middle piece contains a doorway.

10. A litter container as in claim 1, wherein the top piece further comprises a rectangular center panel and two rectangular end panels, foldably connected to the center panel along opposed edges of the center panel, side flaps and top flaps extending from the remaining edges of the end panels, and foldable locking flaps extending from the top flaps; the side flaps, top flaps and locking flaps interlocking to form a lip around the remaining edges of each end panel.

* * * * *